United States Patent

Kofink

[15] 3,699,354
[45] Oct. 17, 1972

[54] CONTROL FOR ELECTRO-MAGNETIC PUMP

[72] Inventor: Siegfried Kofink, Zell, (Neckar), Germany

[73] Assignee: J. Eberspacher, Esslinger/Neckar, Germany

[22] Filed: Nov. 23, 1970

[21] Appl. No.: 92,916

Related U.S. Application Data

[63] Continuation of Ser. No. 838,885, July 3, 1969, abandoned.

[30] Foreign Application Priority Data

July 27, 1968 Germany..........P 17 63 735.3

[52] U.S. Cl..............................307/120, 317/148.5
[51] Int. Cl..............................................H01h 35/00
[58] Field of Search..............307/112, 113, 120, 149; 335/205, 206, 207; 317/5, 148.5, 157

[56] References Cited

UNITED STATES PATENTS 3,417,289  12/1968  Jensen................317/148.5 X
3,424,951  1/1969   Barker................317/148.5 X
3,439,229  4/1969   Ingle..................317/148.5 X
3,462,233  8/1969   Matthews...........317/148.5 X

*Primary Examiner*—Herman J. Hohauser
*Attorney*—McGlew & Toren

[57] ABSTRACT

An apparatus for controlling the operation of an electro-magnetic pump, particularly a fuel pump, for a device such as a combustion heater having an electric motor driven fan for the air supply to the heater includes a gear driven by the motor which drives a rotatable magnetic. The magnet is mounted so that it influences the opening and closing of a switch which is arranged in a circuit controlling the base of a transistor. The transistor is electrically connected to an actuating coil which provides the driving force for a movable piston plunger of the fuel pump. When the switch is closed by the rotation of a magnet it permits flow through the transistor circuit to the coil and actuation of the pump to provide a fuel injection which is timed to the rotation of the magnet.

8 Claims, 2 Drawing Figures

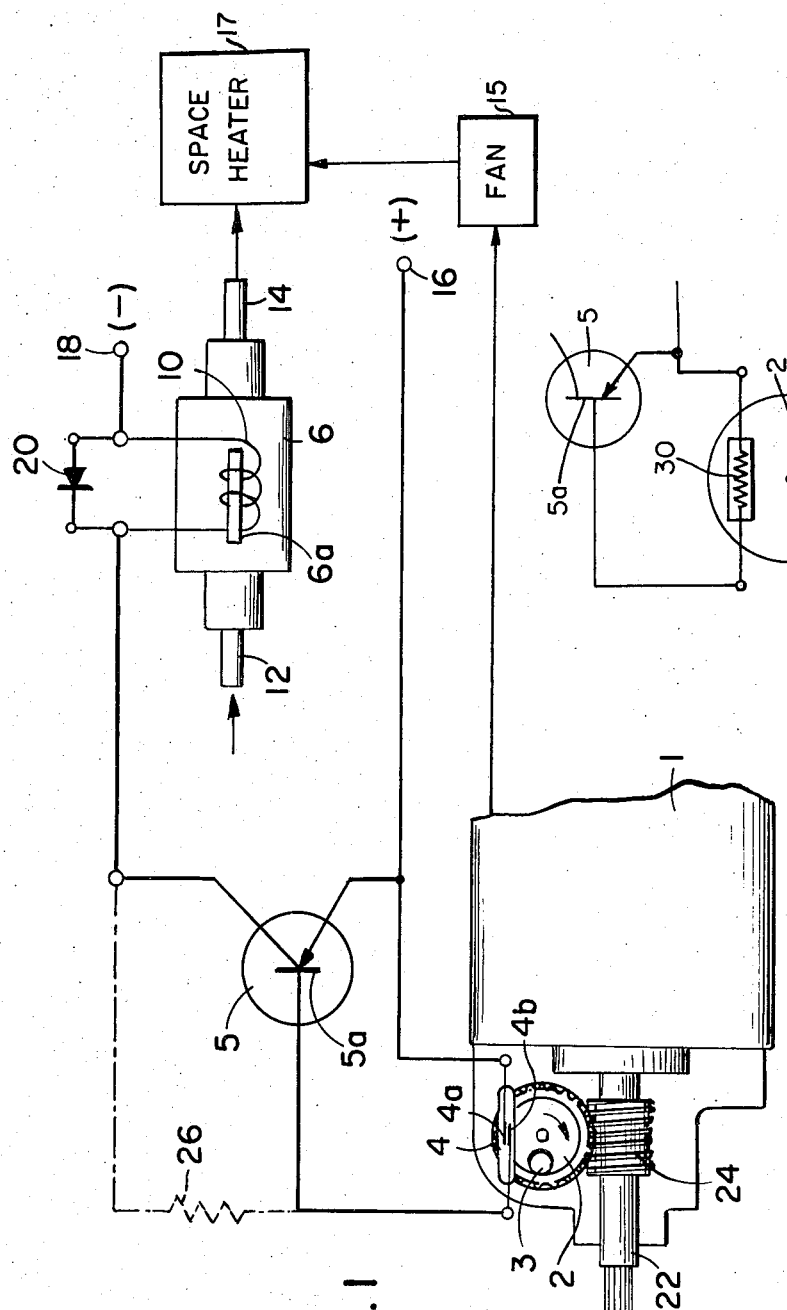

CONTROL FOR ELECTRO-MAGNETIC PUMP

This application is a continuation of application Ser. No. 838,885, filed July 3, 1969, now abandoned.

SUMMARY OF THE INVENTION

This invention relates, in general, to the construction of control devices, and, in particular, to a new and useful control for an electro-magnetic pump which includes a rotatable magnet arranged to operate a control circuit for actuating a coil operated plunger pump.

The present invention is particularly applicable for use in the time feeding of fuel to a combustion device such as a burner for a small heater. Control devices for electro-magnetic pumps are known, but with such devices the control is effected by means of mechanical components, for instance as a function of the number of revolutions of a control shaft. The disadvantages of such an arrangement, however, are that the mechanical parts have relatively short life and they require high power consumption and this of course results in poor efficiency In addition, known devices are hard to regulate when small influx quantities are involved.

In accordance with the present invention, there is provided a control device for operating an electro-magnetic pump which comprises an electric motor which drives through suitable gearing a permanent magnet for influencing the base of a transistor in a control circuit. The magnet is used in conjunction with a switch in the base control circuit for controlling the flow through the transistor to the actuating coil for the magnetic pump. The permanent magnet which is disposed on a rotating part of the gear system for the motor provides a positive control for operating the known magnetic switch or controllable resistor and this in turn controls the base of a transistor through which the electromagnetic dosing pumps receive electro-magnetic impulses. Using the control system of the invention, it is possible to employ an electric interrupter having high quality. The circuit control provides a device with long life and precise switching ability and the control is particularly suited for evaporator burners such as a burner for the heating systems of motor vehicles. With such motor vehicle heating systems it is essential that the operation be independent of the motor and the overall life of such a system is important because the heating system must operate safely without servicing especially when they are switched on and off automatically such as through a timing device.

Accordingly, it is an object of the invention to provide an improved control arrangement for operating an electro-magnetically driven pump particularly a pump for a space heater combustion device of a motor vehicle which includes an electric circuit having a transistor and means for controlling the base of the transistor which includes an electrical connection having a switch which is operated by the movement of a magnet contained on a rotary element associated with the heating device such as an electric driving motor for the air supply.

A further object of the invention is to provide a control device for the regulation of an intermittently operable pump which is simple in design, rugged in construction, and economical to manufacture.

The various features of novelty which characterize the invention are pointed out with particularity in the claims annexed to and forming a part of this specification. For a better understanding of the invention, its operated advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 of the drawing is a partially schematic partially side elevational view of a control device constructed in accordance with the invention; and FIG. 2 is a schematic illustration of an alternative detail of FIG. 1.

GENERAL DESCRIPTION OF THE PREFERRED EMBODIMENT

In FIG. 1, in particular, the invention embodied therein comprises a control for the operation of an electro-magnetic pump generally designated 6 and which is schematically indicated and which includes a pump plunger 6a which is reciprocated in a pumping stroke by the excitation of a coil 10. The movement of the plunger 6a causes a pumping of a liquid such as a fuel through an inlet conduit 12 and discharges it at pressure through an outlet conduit 14.

In accordance with the invention the coil 10 is excited periodically and preferably in timed relationship to an electric motor 1 which may, for example, be employed to drive a fan 15 or similar device for supplying air to a combustion device such as a space heater 17. The coil 10 is connected to a source of potential over terminals 16 and 18 and the negative terminal is connected across the coil through a circuit having a diode 20 to prevent back surging. Connected in series between the positive terminal 16 and the negative terminal 18 is a transistor 5 which has a base 5a which is periodically supplied with a negative impulse to permit current flow through the circuit and into the coil 10.

In accordance with a feature of the invention, the electric motor 1 includes a shaft 22 having a gear 24 thereon which drives through a bevel gear 2 arranged adjacent a switch 4. The bevel gear carries a permanent magnet 3 which is moved during rotation of the bevel gear 2 to influence and move one or more switch contacts 4a or 4b having magnetic characteristics so that the circuit is closed and connected to the base 5a. This energizing of the base 5a permits a large surge of current to flow through the transistor 5 and into the coil 10.

Thus the coil 10 is periodically energized in accordance with the rotation of the magnet 3 to cause the shifting of the plunger 6a and the pumping of the fuel in the spurts necessary for carrying out combustion in properly timed relationship. A biasing resistor 26 is advantageously located in a circuit extending from one side of the switch 4 to the coil circuit 10.

FIG. 2 illustrates a magnetically controllable resistor 30 mounted in place of the switch 4. The resistor 30 when subject to a magnetic field from approach of the magnet 3 changes the bias on the base 5a of transistor 5. This changes the current flow in the collector of transistor 5 whenever the magnet 3 passes the resistor 30. The coil is thus periodically energized in accordance with the rotation of the magnet 3 to shift the plunger 6a. This pumps the fuel in the spurts necessary for carrying out combustion in properly timed relationship.

While embodiments of the invention have been described in detail it will be obvious to those skilled in the art that the invention may be practiced otherwise within its spirit and scope.

What is claimed is:

1. A control device for an impulse-actuated electromagnetic pump, comprising a permanent magnet, revolving means for moving said magnet along a given path, an electro-motor for driving said revolving means, a magnetically controllable resistor along the path of said magnet, a transistor having a base, said magnetically controllable resistor being connected in the base circuit of said transistor, and circuit means for connecting said transistor to control said pump.

2. An intermittent feed system comprising electromagnetic pump means, plunger means on said electro-magnetic pump means for displacing material to be fed, receiver means for utilizing the material, coil means magnetically coupled to said plunger means for moving said plunger means and thereby displacing the matter to be fed, a magnet, rotary means for moving said magnet over a cyclical path, magnetically responsive means in the path of said magnet, transistor means responsive to said magnetically responsive means for actuating said plunger means to feed the matter when said rotary means moves said magnet past said magnetically responsive means, and timing means movable at a speed determined by the rate at which said receiver means utilizes the material for actuating said rotary means.

3. A system as in claim 2, wherein said timing means includes second feeding means for feeding a second material to said receiving means.

4. A system as in claim 3, wherein said plunger means includes means for allowing said plunger to feed material necessary for combustion, and said second feeding means includes means for allowing the feeding of a second material necessary for combustion.

5. A system as in claim 4, wherein said receiving means includes a combustion chamber whose rate of combustion varies with the rate at which the materials are fed.

6. A system as in claim 2, wherein said plunger means includes means for feeding a fuel, said timing means includes a fan for forcing air into said receiving means, and said receiving means includes a combustion chamber for receiving the fuel and the air from the fan.

7. A system as in claim 2, wherein said magnetically responsive means includes a magnetically responsive resistor connected to said transistor means for changing the bias on said transistor means in response to movement of said magnet.

8. A system as in claim 2, wherein said magnetically responsive means includes a switch for changing the bias of said transistor means in response to the movement of said magnet.

* * * * *